United States Patent

[11] 3,571,511

| [72] | Inventor | Jon H. Myer |
| | | Woodland Hills, Calif. |
| [21] | Appl. No. | 770,504 |
| [22] | Filed | Oct. 25, 1968 |
| [45] | Patented | Mar. 16, 1971 |
| [73] | Assignee | Hughes Aircraft Company |
| | | Culver City, Calif. |

[54] DROSOGRAPH DISPLAY SYSTEM
19 Claims, 3 Drawing Figs.

[52] U.S. Cl............................................ 178/7.30,
250/199, 350/285
[51] Int. Cl............................................ H04n 3/02
[50] Field of Search.................................... 350/160,
161, 285; 178/7.5 (D), 5.4 (BPD), 6.6, 7.3 (D),
(Inquired); 332/3 (Inquired); 250/199 (Inquired)

[56] References Cited
UNITED STATES PATENTS
| 2,185,379 | 1/1940 | Myers et al. ................. | 178/7.5D |
| 2,473,825 | 6/1949 | Smith ........................... | 178/7.5D |
| 3,060,429 | 10/1962 | Winston ....................... | 346/75 |
| 3,238,296 | 3/1966 | Nelson et al. ................ | 178/7.5D |
| 3,484,794 | 12/1969 | Winston ....................... | 346/75 |

*Primary Examiner*—Robert L. Griffin
*Assistant Examiner*—Donald E. Stout
*Attorneys*—James K. Haskell and Lewis B. Sternfelo

ABSTRACT: The disclosed system serves to provide live images on a display screen by modulating a light beam projected towards the display screen through a transparent medium having a totally internally reflecting surface. The modulation is accomplished by selectively frustrating the total internal reflection with a stream of solid or liquid particles which are capable of being applied to the reflecting surface electrostatically. Thus, the system may be called a Drosograph Display System, "drosograph" being derived from the Greek words, "drosos" and "graphein," respectively meaning "dew" and "to write".

Patented March 16, 1971    3,571,511
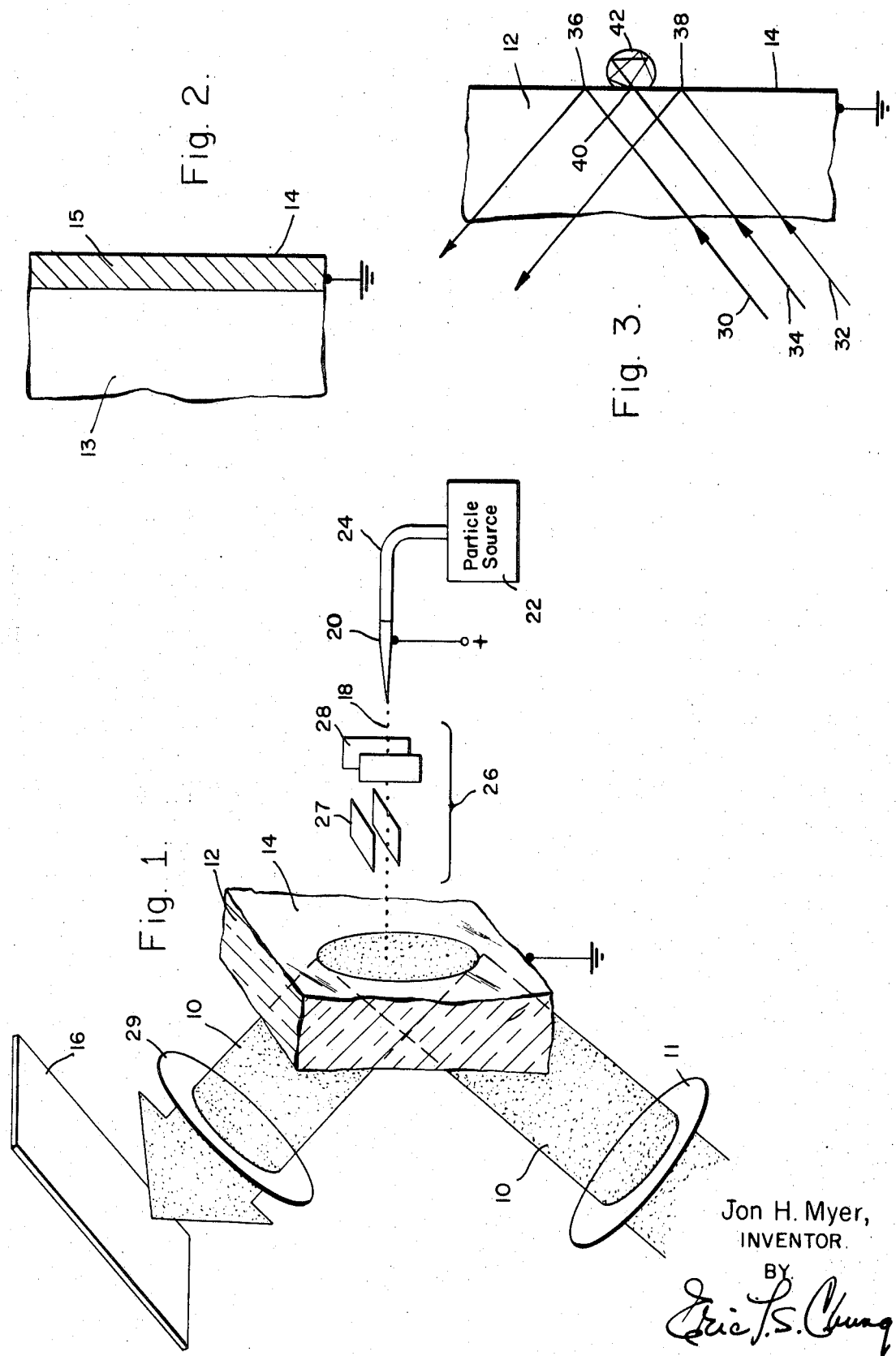
Jon H. Myer,
INVENTOR.
BY
Eric P.S. Chung
ATTORNEY.

DROSOGRAPH DISPLAY SYSTEM

BACKGROUND OF THE INVENTION

This invention relates to an optical system for projecting live images onto a display screen or surface.

The prior art discloses well-known techniques employing systems having a wide variety of structures such as electro-optical light valves and modulators which are used for selectively permitting light to be projected onto a display surface. These systems have, however, generally had one or more deficiencies such as, lack of brilliance, limited contrast, excessive complexity, high cost and limited mass viewing capability. Furthermore, most of the prior art devices do not conveniently provide for the presentation of live images but instead are limited to the projection of recorded images such as those usually appearing on transparencies.

It is well known that total internal reflection is a most efficient method of deflecting radiant energy and that the localized frustration of this reflection can be exploited to generate regions of reduced brightness in which very little energy is reflected. It is this well-known phenomenon that is employed in the present invention.

SUMMARY OF THE INVENTION

Briefly described the present invention involves an optical implementation that allows live images to be projected onto a display screen or surface by modulating an illuminating beam of light projected towards the display screen.

More particularly, a transparent medium having a surface exhibiting the phenomenon of total internal reflection serves to reflect an incident beam of light in the direction of the display screen. Live images are for the purposes of this disclosure considered as images which, if observed with the real scenes depicted, will appear concurrent in time. These live images are created by modulating the incident light beam. This modulation is accomplished by selectively frustrating the total internal reflection with solid or liquid particles applied to the totally internally reflecting surface of the transparent medium.

It is therefore an object of the present invention to provide an optical implementation for displaying live images.

A further object of the present invention is to provide a live image display system that is inexpensive and simple to construct.

Another object of the present invention is to provide display systems which will project an image of high brilliance and contrast.

DESCRIPTION OF THE DRAWINGS

Other objects and many of the attendant advantages of this invention will be more readily appreciated as the same becomes better understood by reference to the following detailed description which is to be considered in connection with the accompanying drawings in which like reference symbols designate like parts throughout the FIGS. thereof and wherein:

FIG. 1 is a schematic diagram illustrating one preferred embodiment of the invention;

FIG. 2 is a schematic diagram illustrating an alternate construction for the transparent medium employed in connection with the present invention; and FIG. 3 is a schematic diagram useful in explaining the phenomenon of total internal reflection in connection with the present invention.

DESCRIPTION OF THE PREFERRED EMBODIMENTS

Referring to FIG. 1, a collimated light beam 10 provided by a polychromatic light source of conventional type (not shown) and a collimating lens 11 is directed at a transparent medium 12 having a surface 14 which serves to totally internally reflect the light beam 10 when incident on the surface 14. The transparent medium 12 may have a suitable number of other surfaces, in addition to the surface 14, having a configuration which will allow the light beam 10 to enter and exit from the medium 12 along the paths generally illustrated in FIG. 1, without significant distortion or attenuation.

As is well known, the phenomenon referred to as total internal reflection will occur when light rays in a dense medium, i.e., having a high refractive index as does glass, are internally incident on a surface of the dense medium on the other side of which is a less dense medium, i.e., having a lower refractive index as does air, provided the angle of incidence is greater than or equal to the critical angle $\theta_c$ of the surface. This critical angle $\theta_c$, which is measured between the normal of the reflecting surface and the incident light ray, may be defined by the expression $$\sin \theta_c = n_2/n$$

where $n_1$ is the refractive index of the dense medium through which incident light rays are directed at the totally internally reflecting surface and $n_2$ is the refractive index of the less dense medium.

The total internal reflection of the light beam 10 by the surface 14 serves to project the light beam 10 towards a suitably placed display screen or surface 16 which is thereby illuminated and able to serve as a viewing surface in the same fashion as do ordinary moving picture screens. A projection lens 29 situated to receive the reflected light beam 10 may be used to focus displays on the display screen 16 by imaging the plane of the totally internally reflecting surface 14 on the screen 16.

Structurally, an opaque material may be used in the construction of the display screen 16 when viewing of presentations thereon is accomplished from the same side of the screen 16 as that from which images are projected. A translucent material may be used if viewing is to be done from the opposite side of the screen 16.

A stream of solid or liquid particles 18 provided by a nozzle 20 connected to a source 22 by an appropriate coupling 24, is directed towards the surface 14. The particles may be any of a variety of fluids or gels having a high resistivity, for example, in the range of $10^7$ to $10^9$ ohm-centimeters.

The particles 18 which are charged by maintaining the nozzle 20 at a high potential, for example 2—4 kilovolts, are caused to travel to the surface 14 of the transparent medium 12 by the electrostatic field created by maintaining the nozzle 20 at the high potential and the area proximate to the surface 14 at a much lower reference potential such as ground potential or a negative potential. Maintaining the area proximate to the surface 14 at the reference potential additionally serves to dissipate the charge of the individual particles 18 thereby preventing the buildup of a repulsive charge on the surface 14 which may repel or otherwise undesirably divert impinging droplets.

The transparent medium 12 may comprise any of the various types of transparent glass, solid polymers or crystals having a high refractive index. It has been found, however, that good results may be obtained by using a semiconductive glass such as that made by either Owens-Illinois or the Corning Glass Co. As is readily discernible, the use of semiconductive glass facilitates maintaining the area proximate to the surface 14 at the desired reference potential.

As an alternative to using a transparent medium 12 that is entirely made of semiconductive glass, one of the more common transparent materials, such as ordinary glass, designated by the numeral 13 in FIG. 2 can be bonded to a sheet of transparent semiconductive material 15 which serves to provide the totally internally reflecting surface. It would then be necessary to maintain only the semiconductive material 15 at the desired reference potential such as ground potential or a negative potential.

Another alternative would be to have the transparent medium 12 entirely constructed of one of the ordinary transparent mediums already mentioned. In this case a screen maintained at the desired reference potential and having apertures larger than the particles 18, which are preferably minute, could be placed, for example, in close proximity to the surface 14.

At the point on the surface 14 contacted by the impinging particles 18, total internal reflection is frustrated. In this fashion the light beam 10 is modulated, images of the points at which frustration of the reflection occurs being projected onto the display screen 16 and appearing thereon as dark areas or traces.

Frustration of the total internal reflection of the surface 14 can be better understood by referring to FIG. 3. The light rays 30 and 32 are shown as being totally internally reflected by the surface 14 in the manner previously explained in that no particles are present to frustrate the total internal reflection at the respective points 36 and 38. On the other hand a particle 42 is present and in intimate contact with the surface 14 at the point 40 where the light ray 34 is incident. The result is that the light ray 34 passes through the surface 14 instead of being reflected and is dissipated or otherwise absorbed by the fluid droplet 42. This dissipation or absorption is caused by the shape and/or optical properties of the particle. For example, a transparent globular particle such as provided for by a deposited liquid or gel will entrap the light as shown in FIG. 3 thereby preventing reflection. Alternately, a disc-shaped particle which intimately contacts the totally internally reflecting surface with one of its flat faces will frustrate the reflection only if it the particle is composed of a nontransparent medium since a disc-shaped transparent particle would only effectively move the plane of reflection to a new location, the flat face of the particle not in contact with the surface 14, and not frustrate the reflection.

It is thus clear that desired live images may be projected onto the display screen 16 by selectively causing the particles 18 to strike the surface 14 in a pattern corresponding to the desired images. These patterns can be produced by simply moving the nozzle 20 as one would normally move a pen or pencil when writing. Alternatively, the path of the particles 18 can be controlled, as illustrated in FIG. 1, by a suitable deflection device 26 comprising, for example, conventional pairs of vertical electrodes 27 and horizontal electrodes 28, through which the stream of particles 18 is projected. Appropriate control signals supplied by a conventional source (not shown) would be applied in this case to the electrode pairs 27 and 28 to deflect the stream of particles 18 in the desired directions.

Erasure of the live images no longer needed may be effected by removing the particles 18 from the surface 14. This can be accomplished by simply washing and/or wiping the surface 14 clean. If washing is done with an easily evaporated fluid such as Freon, little to no wiping is necessary. Further, rapid evaporation may be induced by appropriately heating the surface 14.

While preferred embodiments of the present invention have been described hereinabove, it is intended that all matter contained in the above description and shown in the accompanying drawings be interpreted as illustrative and not in a limiting sense and that all modifications, constructions and arrangements which fall with the scope and spirit of the present invention may be made.

I claim:

1. A system for forming light images comprising:
   a source of light rays;
   means having a totally internally reflecting surface for redirecting light incident thereon in a predetermined direction by total internal reflection;
   means for projecting the light rays from said light source onto said totally internally reflecting surface for redirecting the light rays incident on said surface in the predetermined direction;
   means for projecting a plurality of light-dissipating particles onto selected points of contact with said reflecting surface; and
   said particles modulating the incident light rays at the points of contact by frustrating the total internal reflection at the points.

2. The system defined by claim 1 further comprising a display screen situated to receive the redirected incident light rays for display of the light images.

3. The system defined by claim 2 further comprising a projection lens for focusing the redirected incident light rays on said display screen.

4. The system defined by claim 1 wherein said incident light rays are collimated.

5. The system defined by claim 1 wherein said means having a totally internally reflecting surface includes a transparent medium.

6. The system defined by claim 5 wherein said totally internally reflecting surface is flat.

7. The system defined by claim 1 wherein the area proximate to said totally internally reflecting surface is maintained at a predetermined reference potential.

8. The system defined by claim 1 further comprising a source of said particles separate from said surface and wherein said means for projecting said particles comprises:
   means for impinging said particles on said surface at the points of contact; and
   means for selecting the location of the points of contact on said surface to be impinged by said particles.

9. The system defined by claim 8 wherein said means having a totally internally reflecting surface includes a transparent medium.

10. The system defined by claim 9 further comprising a display screen situated to receive the redirected incident light rays for a display of the light images.

11. The system defined by claim 10 further comprising a projection lens for focusing the redirected incident light rays on said display screen.

12. The system defined by claim 11 wherein the area proximate to said totally internally reflecting surface is maintained at a predetermined reference potential.

13. The system defined by claim 12 wherein said totally internally reflecting surface is flat.

14. The system defined by claim 13 wherein said incident light rays are collimated.

15. The system defined by claim 8 wherein said location selecting means comprises means for moving said source relative to said reflecting surface.

16. The system defined by claim 8 wherein said particles are provided with an electrostatic charge and said location selecting means comprising electrostatic deflection means.

17. The system defined by claim 16 wherein said electrostatic deflection means comprises two pairs of orthogonally positioned plates.

18. The system defined by claim 16 wherein the area proximate to said internally reflecting surface is maintained at a potential opposite to the charge of said particles to prevent an accumulation of a repulsive potential repulsive to said particles.

19. A system for displaying graphic information on a screen comprising:
   a source of polychromatic light;
   a light-reflecting medium having total internally light-reflecting means positioned in the path of the light to effect a redirection of the light toward the screen;
   a plurality of individual light-absorbing particles; and
   means operative upon said particles for selectively projecting said particles on said light-reflecting means at any number of points thereon for frustrating portions of the redirection of the light at the points in a manner corresponding to the graphic information.